US008826033B1

(12) United States Patent
Krishnaprasad et al.

(10) Patent No.: US 8,826,033 B1
(45) Date of Patent: Sep. 2, 2014

(54) DATA PROTECTION USING VIRTUAL-MACHINE-SPECIFIC STABLE SYSTEM VALUES

(75) Inventors: Ajay Venkateshan Krishnaprasad, Stony Brook, NY (US); Parasuraman Narasimhan, Hyderabad (IN); Robert Polansky, Westwood, MA (US); Magnus Nyström, Sammamish, WA (US)

(73) Assignee: EMC Corporation, Hopkinton, MA (US)

( * ) Notice: Subject to any disclaimer, the term of this patent is extended or adjusted under 35 U.S.C. 154(b) by 447 days.

(21) Appl. No.: 12/644,195

(22) Filed: Dec. 22, 2009

(51) Int. Cl.
*G06F 21/22* (2006.01)
(52) U.S. Cl.
USPC ............ 713/187; 726/6; 726/22; 726/32; 726/30; 713/189
(58) Field of Classification Search
USPC .............................................. 726/1–7, 26–33
See application file for complete search history.

(56) References Cited

U.S. PATENT DOCUMENTS

| | | | |
|---|---|---|---|
| 2005/0193218 A1* | 9/2005 | Susser et al. ................ | 713/201 |
| 2008/0082447 A1* | 4/2008 | Jogand-Coulomb et al. ... | 705/53 |
| 2008/0134178 A1* | 6/2008 | Fitzgerald et al. ............... | 718/1 |

OTHER PUBLICATIONS

Rob's Guide using VMware Publication 2005—Rob Sebastiaasen.*
VM networking Nov. 2009—Blade Technologies.*
Eric Gray Aug. 2009—VMware ESxi 4 on 64mb flash drive.*
"EMC® PowerPath® Encryption with RSA® Version 5.2 for Solaris and Windows," User Guide, EMC Corporation, 2008, pp. 1-9, 28, 153 and 195-196.
"Shamir's Secret Sharing," from Wikipedia, http://en.wikipedia.org/wiki/Shamir%27s_Secret_Sharing, printed Apr. 19, 2010, pp. 1-4.
"VMware VMotion Live Migration for Virtual Machines Without Service Interruption," vmware product datasheet, 2009, pp. 1-2.
"Windows Data Protection," Microsoft Corporation, http://msdn.microsoft.com/en-us/library/ms995355(printer).aspx, printed Apr. 19, 2010, pp. 1-17.

* cited by examiner

*Primary Examiner* — Jung Kim
*Assistant Examiner* — Tri Tran
(74) *Attorney, Agent, or Firm* — BainwoodHuang

(57) ABSTRACT

A virtual machine on a physical host computer provides controlled access to protected data by creating and storing a "stored system fingerprint" from stable system values (SSVs) as existing when creating the stored system fingerprint. The SSVs include virtual-machine-specific values that change upon cloning the virtual machine (VM) but do not change upon migration of the VM. Upon a request for access to the protected data, a current system fingerprint is calculated from the SSVs as existing when processing the request, the current system fingerprint is compared to the stored system fingerprint to determine whether there is a predetermined degree of matching, and the requested access to the protected data is permitted only if there is the predetermined degree of matching.

16 Claims, 4 Drawing Sheets

DATA PROTECTION USING VIRTUAL-MACHINE-SPECIFIC STABLE SYSTEM VALUES

BACKGROUND

The present invention is related to the field of data protection.

It has been known to employ so-called "stable system values" or SSVs as a form of data protection in data processing systems. Sensitive data such as encryption seeds or keys are stored in a computer so as to be accessible via a secure access method. The secure access method creates and stores a "system fingerprint" from SSVs of the computer, such as respective identifiers of the CPU, disk(s) and/or BIOS, and/or a MAC address or similar hardware-level identifier of a network interface of the computer system. Requests are typically made by applications running in unattended startup mode, as server-based applications typically need to be able to restart in the face of system reboots without operator intervention. Upon each request for access to the sensitive data, the access method queries its operating environment to obtain the SSVs as existing at the time of the request, and calculates the current system fingerprint. This value is compared to the stored system fingerprint. If some threshold number of the SSVs match, then access is provided, and otherwise access is not provided. In this manner, there is protection against attempts to access the sensitive data which involve copying the data to another computer. In such a scenario, there will generally not be sufficient matching between the SSVs of the other computer to those of the original computer, and thus the comparing of system fingerprints will fail and access will properly be denied.

There is an increasing movement in the computing industry toward virtualized computing, in which user-visible computing elements are software abstractions rather than actual hardware components, with the software abstractions mapping to and being realized by the underlying hardware components using virtualization software. So-called "virtual machines" are software instances of entire computer systems, complete with virtual components such as virtual CPUs, virtual memory, virtual storage devices, and virtual network interface circuitry. Virtualized computing can provide several benefits, for example in the management and efficiency of larger complex systems such as server farms. Virtual machines can be deployed and re-configured much more easily than physical machines to meet operating demands.

SUMMARY

There is a need for computer systems to provide SSV-style data protection in virtualized computing environments in which the data protection component(s) are executing as part of a virtual machine (VM). In such an environment, a given VM is only indirectly connected to underlying hardware resources, and there may be multiple VMs operating on the same physical host machine so that many of the physical-level SSVs are not unique to a given VM. Not only is it necessary to have SSVs that are uniquely associated with a particular VM, it is also desirable that any SSV-based method be able to distinguish the potentially improper cloning of a VM from the mere migration or moving of a VM from one physical host machine to another. Migration is a normal part of the operation of VM-based computer systems. Although cloning also has proper uses, it is used more as part of set-up and configuration rather than during operation, and can be a convenient tool for an intruder trying to obtain improper access to protected data.

Thus, disclosed is a method by which a virtual machine executing on a physical host computer provides controlled access to protected data. Generally, the method includes creating and storing a "stored system fingerprint" from SSVs as existing at a time of creating the stored system fingerprint. The SSVs include some number of VM-specific values that change in the event of cloning the VM but do not change in the event of moving the VM from one physical machine to another physical machine. Examples of such SSVs include a VM identifier or a VM BIOS identifier which may be assigned by a VM monitor.

As part of processing a request for access to the protected data, the method includes calculating a current system fingerprint created from the SSVs as existing at the time of processing the request, comparing the current system fingerprint to the stored system fingerprint to determine whether there is a predetermined degree of matching, and permitting the requested access to the protected data only if there is the predetermined degree of matching. In one embodiment, the comparing can include performing a set of comparisons of individual stored hashes of SSVs to hashes of current values of the SSVs, tallying a number of the comparisons which indicate a match, and then comparing the number of matches to a threshold. For example, the fingerprint might employ a set of 7 SSVs total and it is required that at least 5 match. Preferably, the threshold is set so that at least one of the VM-specific SSVs must match, in order to detect potentially unauthorized cloning of the VM such that any requested access to the protected data should properly be denied.

The disclosed technique enables use of fingerprint-based data protection techniques in virtual-processing environments, enabling the benefits of such techniques to be realized as computer technology evolves toward greater use of virtualized computing. Stable system values can be combined with other sensitive data protection technologies such as virtual TPMs, USB devices attached to the physical host, hardware security modules, etc.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
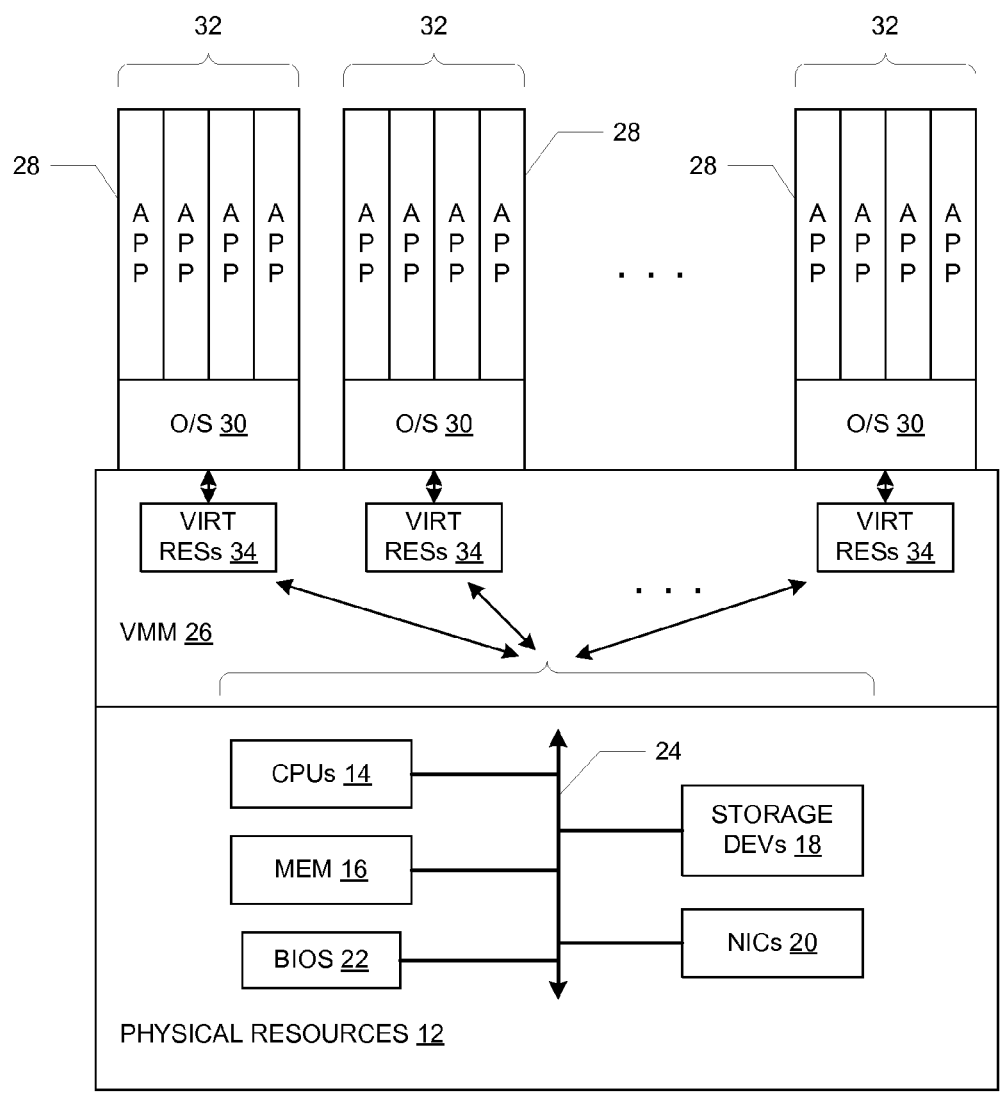
FIG. 1 is a block diagram of a computer system.

FIG. 1 shows a computer system 10 providing a virtual machine (VM)-based processing environment. The computer system 10 includes a set of physical resources 12 such as processor(s) (shown as CPUs) 14, memory (MEM) 16, storage device(s) (STORAGE DEVs) 18 and interface circuitry such as network interface card(s) (NICs) 20. The physical resources 12 also typically include basic input-output system (BIOS) software 22 typically stored in nonvolatile semiconductor memory. The various components are coupled together for data transfer by interconnection circuitry 24, which normally includes one or more high-speed data transfer buses.

In operation, the physical resources 12 are used by operating software which is executed by the CPUs 14 from the memory 16. The operating software includes a virtual machine monitor (VMM) 26 and one or more virtual machines (VMs) 28. Each VM 28 includes a respective operating system (O/S) 30 and one or more application programs shown as APPs 32. The VMM 26 provides a set of virtual resources 34 to each of the VMs 26 which map to and are realized by the underlying physical resources 12. For example, each set of virtual resources 34 includes one or more virtual NICs which map to respective physical NICs 20. Each VM 28 interfaces to its respective virtual NIC as though it were a physical NIC under sole control of the VM 28, and the VMM 26 is responsible for controlling the underlying physical NIC 20 to provide the NIC functions (such as communications with external network devices) to each VM via the respective virtual NIC.

Figure 2:
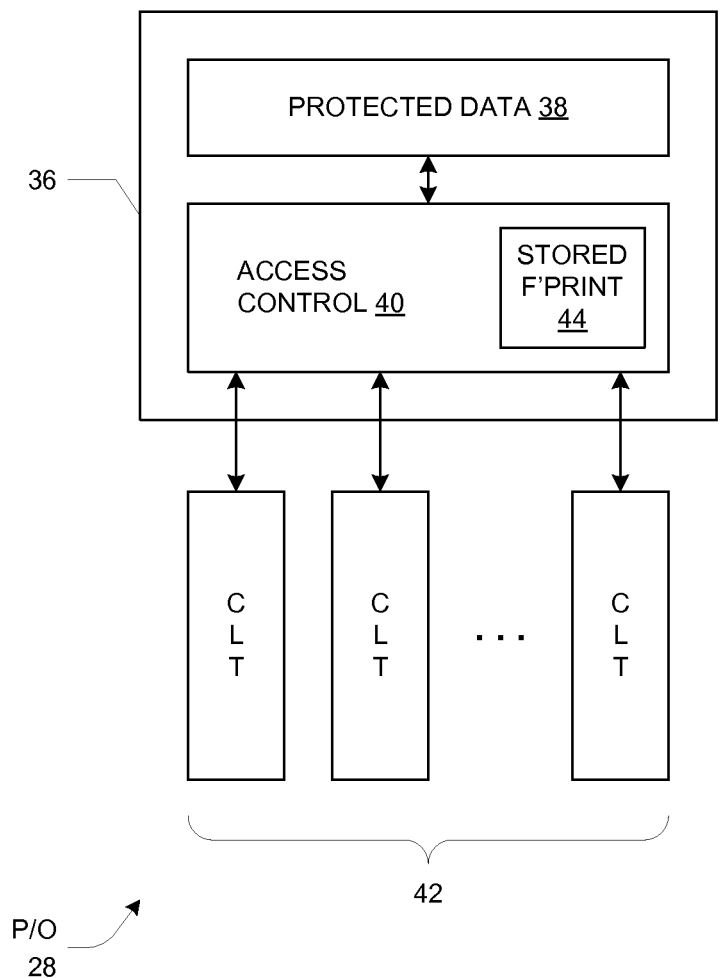
FIG. 2 is a schematic diagram of a data security component interfacing to client applications.

FIG. 2 illustrates certain operating software within a VM 28, which generally may be part of one or more of the applications 32 of FIG. 1 and/or may reside partly or wholly in the O/S 30 of a VM 28. A data security component 36 includes protected data 38 and an access control function 40 to provide secure access to the protected data 38 by one or more client programs or services (CLTs) 42. In operation, the clients 42 require access to the protected data 38 to perform certain functions, and the access control function 40 mediates the access to provide a measure of security. Details of the access control method are provided below.

The general structure of FIG. 2 can be used in a variety of applications where access to sensitive data is controlled. One class of such applications involves data encryption, where the protected data 38 includes encryption keys or seed values for generating encryption keys, used by the clients 42 to encrypt communications or transactions performed by an application 32 of the VM 28 (see FIG. 2). The data security component 36 may be contained entirely within such an application 32, or it may be a separate component of the VM 28 providing services to multiple applications 32. Various kinds of applications 32 can be supported, including for example an identity management system (IMS) used to perform identity-based user authorization, and applications referred to as "software tokens" which are analogous to hardware-based authentication tokens such as RSA SecurID tokens in widespread use for enhanced, encryption-based user authentication.

As shown, the access control function 40 stores a "stored system fingerprint" (STORED F'PRINT) 44 which is a derived value generated by applying a function to a set of "stable system values" or SSVs that are contained within the operating environment of the VM 28. Specific examples of functions and SSVs are provided below. Generally, the SSVs are chosen such that the stored system fingerprint 44 provides a unique identification of a particular VM 28, and the system fingerprint is stored under conditions of proper authorization to do so, as when a VM 28 is first created and configured by a system administrator. In operation, the stored system fingerprint 44 is compared against a current system fingerprint calculated from the SSVs as existing at the time a request is made to access the protected data 38. A mismatch indicates that the VM 28 may be an unauthorized clone or copy, and thus the detection of a mismatch can be used to deny access to the protected data 38 on the grounds that the client 42 requesting such access may not be authorized to access the protected data 38.

The data security component 36 may provide different forms of access to the protected data 38. For example, it may have an "attended" mode which assumes the involvement of an authorized entity that can provide a password or similar credential as proof of proper authorization to access the protected data 38, as well as an unattended or "system" mode in which no such authorized entity is involved. In the attended mode, access can be granted based simply on the presentation of the proper credentials, whereas in the system mode it is necessary to infer proper authorization by some other means. The technique disclosed herein may advantageously be used in such unattended or system-mode operation. The technique is based on establishing an association between a VM 28 and its operating environment, and re-identifying the actual operating environment as part of granting access to the protected data 38. The re-identifying of the proper operating environment serves as an indicator that the access is authorized.

Figure 3:
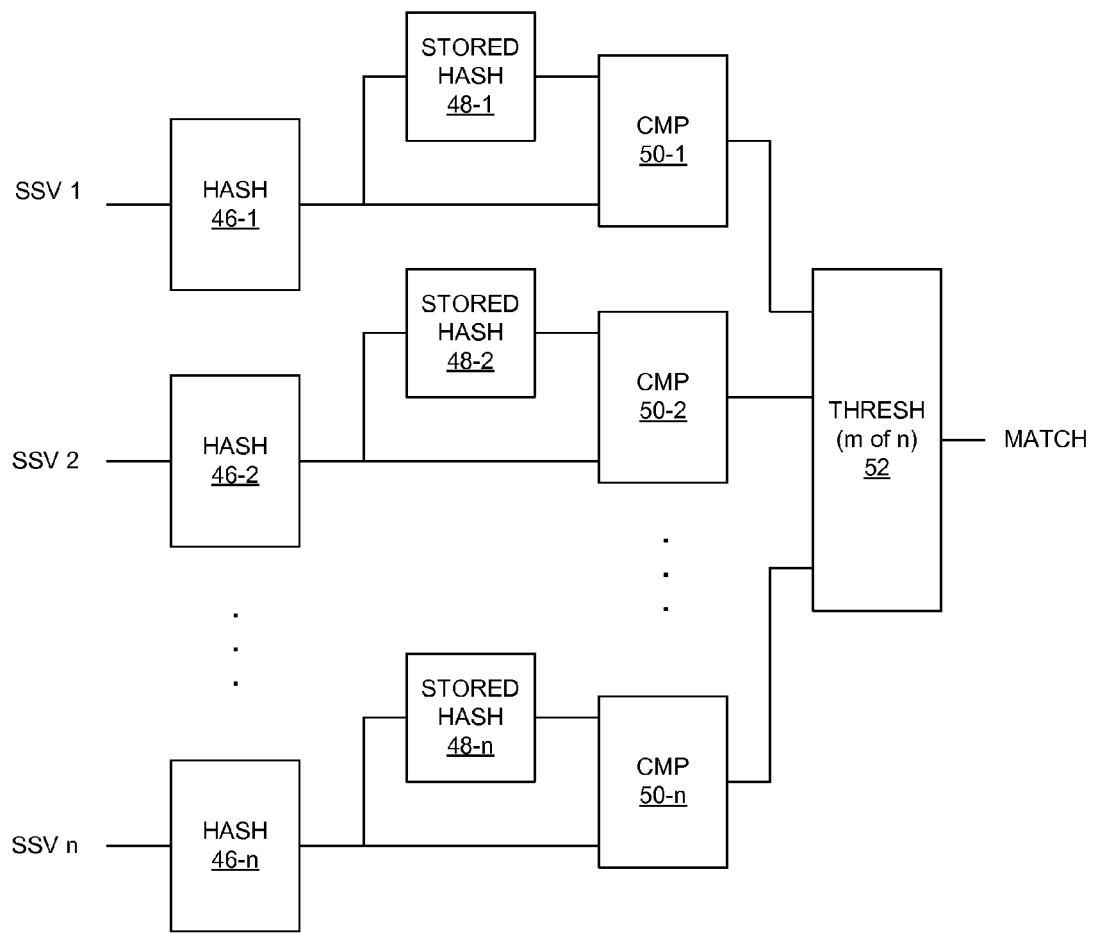
FIG. 3 is a schematic diagram of the creation and use of a stored system fingerprint.

FIG. 3 illustrates the creation, storage and use of the stored system fingerprint 44 of FIG. 2. Each of several SSVs (shown as SSV 1 through SSV n) are applied to respective hash functions (HASH) 46. During a process of creating or updating the stored system fingerprint 44, the results of the hash functions 46 are stored as respective stored hash values 48. The set of stored hash values 48 forms the stored system fingerprint 44. Not all hash functions 46 need to be identical, nor do they all need to be hash functions—other types of functions may be used or no function may be applied at all. It will be appreciated that the stored system fingerprint 44 is based on the values of the SSVs at the time that it was created and stored.

During the processing of a request to access the protected data 38, comparison circuitry shown as a set of compare (CMP) functions 50 is used to compare the hashed value of the current value of each SSV to the respective stored hash value 48, and the result of all the comparisons from the compare functions 50 is applied to a threshold function 52 which determines whether at least some minimum number m of the n SSVs match. It will be appreciated that the set of hashed values from the hash functions 46 represents a "current system fingerprint" calculated based on current values of the SSVs. Generally, the current system fingerprint and stored system fingerprint 44 are expected to match, because generally the SSVs for the VM 28 do not change during normal authorized operation. If the current system fingerprint does not match the stored system fingerprint 44, it is an indication that the SSVs for the VM 28 have changed in a way that indicates that the VM 28 may have been improperly cloned and that access to the protected data 38 may not be authorized.

If the threshold function 52 determines that at least some minimum number m of the n SSVs match, then an output signal MATCH is asserted, and if not then the output signal MATCH is deasserted. The signal MATCH can be used in the process of granting or denying access to the protected data 38, as more fully described below. The threshold function 52 may be implemented, for example, as a tally function which counts the number of matching SSVs as reported by the compare functions 50, followed by a comparator to compare the tally of matches with the threshold number m.

Before a description of SSVs suitable for use to protect data in a virtualized environment such as that of FIG. 1, a brief description is presented of the use of SSVs in a non-virtualized computer system, i.e., a computer system having a single O/S and set of applications directly accessing underlying physical resources such as CPUs, memory, disks etc. In will be appreciated that the protection technique described with reference to FIGS. 2 and 3 can also be used in such an environment to protect against unauthorized access to the protected data, for example if the protected data were improperly copied to another physical machine at which the unauthorized access occurs. For such a use of the protection technique, the following list provides examples of SSVs that can serve as part of the system fingerprint. It will be noted that many of these are unique to particular hardware components of a computer system:

BIOS Version
Machine ID
MAC Address (NIC identifier)
Disk serial number (SN)
Disk controller ID
CPU ID
Disk Partition IDs
O/S Name, Version
Memory size
Motherboard ID There are two issues with utilizing the SSVs of the above list in a virtual-processing computer system of the type shown in FIG. 1. One, the VMs 28 only have access to the virtual resources 34 from the VMM 26, and not to the physical resources 12. This leads to the second issue, which is that there is no guarantee that virtualized versions of the above SSVs as made available to each VM 28 are sufficiently unique to the VM 28. In fact, many of the above parameters will not be unique among the VMs 28 operating on a given physical host, for example CPU ID and disk partition ID. Thus, for effective operation of the data protection technique, it is important to select at least some SSVs that are unique to a particular VM 28. Moreover, it is desired to select such SSVs that do not change if the VM 28 is only moved or migrated, but that do change if the VM 28 is cloned. This is because migration is a normal part of VM system operation, whereas cloning is more of an administrative function and is a convenient vehicle for information theft. By using such VM-specific SSVs, the protection method can better detect that the VM 28 may have been cloned and that access to the protected data 36 may be unauthorized. It is noted that moving a VM 28 means moving it to another physical location, whereas cloning a VM 28 means making a new VM 28 which is a substantially identical copy of an existing VM 28. Basically, a clone is identical except for certain VM parameters, as generally known to those in the art.

The following table presents examples of SSVs that are unique to individual VMs 28, along with information regarding whether/how the value of the SSV changes upon migration or cloning of the VM:

| SSV | Description | Cloning | Migration |
|---|---|---|---|
| VMID | VM identifier, assigned by VMM | Changes | Does not change |
| uuid.bios | VM BIOS identifier | Changes | Does not change |
| vc.uuid | Virtual Center identifier | Changes | Does not change |
| uuid.location | Location of VM on storage device | Changes | Changes |

The above example SSVs exist in a particular implementation of the VMM 26 known as VMWARE®, and in that commercial embodiment they are all 128-bit values. It will be appreciated that other analogous SSVs may exist and be utilized in alternative embodiments.

Returning now to the scheme of FIG. 3, to obtain the desired protection in a virtual-processing environment such as that of FIG. 1, some number of the SSVs that make up the system fingerprint should be VM-specific SSVs such as those shown in the above table, in order to ensure that improper cloning of a VM 28 will be detected by the access control function 40. It may also be desirable that there be sufficient VM-specific SSVs that the threshold function 52 will not find a match if all of them are non-matching. For example, if three VM-specific SSVs are used, then it would be desirable that the value n−m be less than three, so that access is not granted based on only the matching of non-VM-specific SSVs alone.

Figure 4:
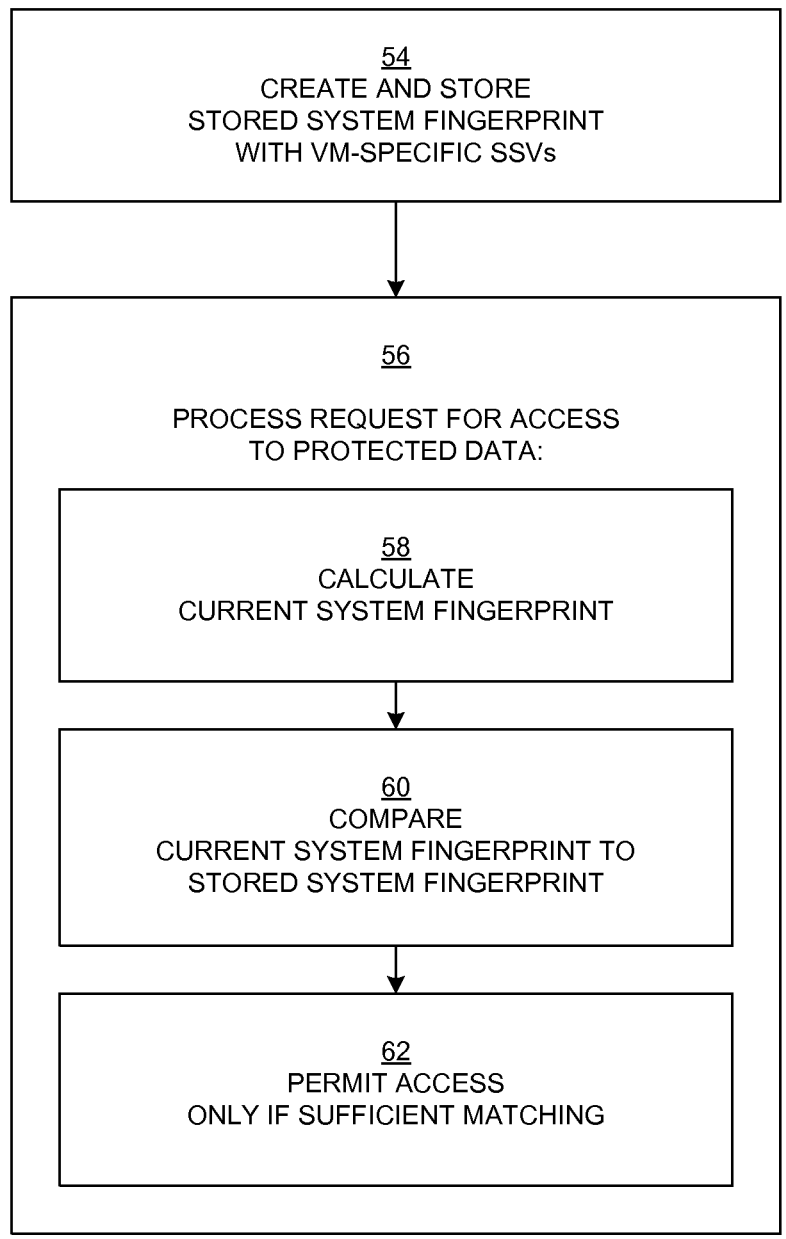
FIG. 4 is a flow diagram of a process for providing controlled access to protected data using the stored system fingerprint.

FIG. 4 provides a flow-chart description of a method by which the access control function 40 of a VM 28 provides controlled access to the protected data 38 of that VM 28. As shown at 54, a system fingerprint is created from SSVs as existing at a time of creating the stored system fingerprint, and this system fingerprint is stored and thus referred to as a "stored system fingerprint" 44. As described above, the SSVs include at least a predetermined number of VM-specific values that change in the event of cloning the VM 28 but do not change in the event of moving or migrating the VM 28 from one physical machine to another physical machine.

As shown at 56, various actions are taken as part of processing a request for access to the protected data 38. At 58, a current system fingerprint is calculated based on the stable system values as existing at the time of processing the request. As noted above, under normal circumstances these are expected to be the same as the SSVs used in creating the stored system fingerprint 44, but in some cases (notably cloning of the VM), they might not be. At 60, this current system fingerprint is compared to the stored system fingerprint 44 to determine whether there is a predetermined degree of matching therebetween. In one embodiment this degree of matching may be determined by a threshold function 52, although other techniques may be used in alternative embodiments. At 62, the requested access to the protected data is permitted only if the comparing at 60 indicates that there is the predetermined degree of matching between the current system fingerprint and the stored system fingerprint, and otherwise the requested access to the protected data is denied. Although this is presented as a binary outcome, in some cases the permitting or denying of access may be further conditioned on other information. For example, there may be some type of system override which forces either a granting or denial of access, or there may be some other criteria that is used either in conjunction with or in the alternative to the detection of matching of the stored and current system fingerprints.

Although in the above description each SSV value is subject to hashing and an exact comparison of the hash with a stored hashed SSV value (via a compare function 50), in some cases one or more of the SSVs may be subject to other types of comparisons, which may include range checking rather than checking for single values. For example, an SSV may be a measurement of some operating parameter of the computer system 10 which is normally within some given range. This normal range can be stored, forming part of the stored system fingerprint 44, and then at the time of an access request the actual measured parameter value can be compared with the stored range.

In the description of FIG. 3, it is described that the stored hash values 48 are created or updated at times when authorization to do so is either explicitly or implicitly present. If the system operates primarily in the system (unattended) mode, then it is desirable that the updating be automated in some fashion while retaining some level of security. One method that can be employed is to update the stored hash values 48 whenever the access control function 40 permits access to the protected data 42.

It is noted that cloning a VM 28 may be accomplished using a cloning operation of the VMM 26 which creates an identical copy of the VM 28 while maintaining the existence and operation of the original VM 28, while moving or migrating a VM 28 includes performing a migration operation of the VMM 26 which moves the VM 28 without duplication from one physical location to another.

While various embodiments of the invention have been particularly shown and described, it will be understood by those skilled in the art that various changes in form and details may be made therein without departing from the spirit and scope of the invention as defined by the appended claims.

What is claimed is:

1. A method by which a virtual machine executing on a physical host computer provides controlled access to protected data stored by the virtual machine, comprising:
    executing a data security component on the virtual machine, the data security component including the protected data and an access control function providing secure access to the protected data by a client application executing on the virtual machine;
    creating and storing a stored system fingerprint from stable system values as existing at a time of creating the stored system fingerprint, the stable system values including at least a predetermined number of virtual-machine-specific values that change in the event of cloning the virtual machine but do not change in the event of moving the virtual machine from one physical machine to another physical machine; and
    by the access control function at a later time of processing a request from the client application to access the protected data, controlling access to the protected data based on the stored system fingerprint by (1) calculating a current system fingerprint created from the stable system values as existing at the later time of processing the request, (2) comparing the current system fingerprint to the stored system fingerprint to determine whether there is a predetermined degree of matching therebetween, and (3) if the comparing indicates that there is the predetermined degree of matching between the current system fingerprint and the stored system fingerprint, then permitting the requested access to the protected data, and otherwise denying the requested access to the protected data.

2. A method according to claim 1, wherein comparing the current system fingerprint to the stored system fingerprint includes:
    comparing the stable system values as existing at the time of processing the request to corresponding portions of the stored system fingerprint to generate a set of match indications; and
    tallying a number of the match indications and comparing the number with a predetermined threshold.

3. A method according to claim 2, wherein the number of the virtual-machine-specific values is greater than a difference between a total number of compared values and the predetermined threshold.

4. A method according to claim 2, wherein one or more of the portions of the stored system fingerprint are range values specifying a range against which the corresponding stable system value is compared.

5. A method according to claim 1, wherein the virtual-machine-specific values include one or more values selected from the group consisting of a virtual machine identifier assigned to a virtual machine by a virtual machine monitor, a virtual machine BIOS identifier, and a virtual center identifier.

6. A method according to claim 1, wherein the stable system values include parameters selected from the group consisting of a BIOS, an extensible firmware interface or other firmware version, a machine identifier, a network interface card identifier, a disk serial number, a disk controller identifier, a processor identifier, a disk partition identifier, an operating system version, a memory size and a motherboard identifier.

7. A method according to claim 1, wherein the protected data includes encryption-related data used by the client application to perform data encryption functions.

8. A method according to claim 1, wherein cloning the virtual machine includes performing a cloning operation of a virtual machine manager which creates a substantially identical copy of the virtual machine while maintaining the existence and operation of the virtual machine, and moving the virtual machine includes performing a migration operation of the virtual machine manager which moves the virtual machine without duplication from one physical location to another.

9. A computer system, comprising:
    a set of physical resources of a physical host computer, the physical resources including memory and a processor; and
    software stored in the memory and executed by the processor, the software including a virtual memory manager and at least one virtual machine, the virtual machine executing a data security component operative to provide controlled access to protected data, the data security component including the protected data and an access control function providing secure access to the protected data by a client application executing on the virtual machine by:
        A) creating and storing a stored system fingerprint from stable system values as existing at a time of creating the stored system fingerprint, the stable system values including at least a predetermined number of virtual-machine-specific values that change in the event of cloning the virtual machine but do not change in the event of moving the virtual machine from one physical machine to another physical machine; and
        B) by the access control function at a later time of processing a request from the client application to access the protected data, controlling access to the protected data based on the stored system fingerprint by (1) calculating a current system fingerprint created from the stable system values as existing at the later time of processing the request, (2) comparing the current system fingerprint to the stored system fingerprint to determine whether there is a predetermined degree of matching therebetween, and (3) if the comparing indicates that there is the predetermined degree of matching between the current system fingerprint and the stored system fingerprint, then permitting the requested access to the protected data, and otherwise denying the requested access to the protected data.

10. A computer system according to claim 9, wherein comparing the current system fingerprint to the stored system fingerprint includes:
    comparing the stable system values as existing at the time of processing the request to corresponding portions of the stored system fingerprint to generate a set of match indications; and
    tallying a number of the match indications and comparing the number with a predetermined threshold.

11. A computer system according to claim 10, wherein the number of the virtual-machine-specific values is greater than a difference between a total number of compared values and the predetermined threshold.

12. A computer system according to claim 10, wherein one or more of the portions of the stored system fingerprint are range values specifying a range against which the corresponding stable system value is compared.

13. A computer system according to claim 9, wherein the virtual-machine-specific values include one or more values selected from the group consisting of a virtual machine identifier assigned to a virtual machine by a virtual machine monitor, a virtual machine BIOS identifier, and a virtual center identifier.

14. A computer system according to claim 9, wherein the stable system values include parameters selected from the group consisting of a BIOS version, an extensible firmware interface or other firmware version, a machine identifier, a network interface card identifier, a disk serial number, a disk controller identifier, a processor identifier, a disk partition identifier, an operating system version, a memory size and a motherboard identifier.

15. A computer system according to claim 9, wherein the protected data includes encryption-related data used by the client application to perform data encryption functions.

16. A computer system according to claim 9, wherein cloning the virtual machine includes performing a cloning operation of a virtual machine manager which creates a substantially identical copy of the virtual machine while maintaining the existence and operation of the virtual machine, and moving the virtual machine includes performing a migration operation of the virtual machine manager which moves the virtual machine without duplication from one physical location to another.

* * * * *